(12) United States Patent
Ogihara et al.

(10) Patent No.: US 7,205,338 B2
(45) Date of Patent: Apr. 17, 2007

(54) COMPOSITION FOR FORMING POROUS FILM, POROUS FILM AND METHOD FOR FORMING THE SAME, INTERLEVEL INSULATOR FILM, AND SEMICONDUCTOR DEVICE

(75) Inventors: Tsutomu Ogihara, Niigata-ken (JP); Fujio Yagihashi, Niigata-ken (JP); Hideo Nakagawa, Oumihachiman (JP); Masaru Sasago, Hirakata (JP)

(73) Assignees: Shin-Etsu Chemical Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 377 days.

(21) Appl. No.: 10/796,170

(22) Filed: Mar. 9, 2004

(65) Prior Publication Data

US 2004/0180222 A1  Sep. 16, 2004

(30) Foreign Application Priority Data

Mar. 10, 2003  (JP)  ............... 2003-062605

(51) Int. Cl.
*C08G 77/50* (2006.01)
*C08L 83/14* (2006.01)
*C01B 33/113* (2006.01)

(52) U.S. Cl. .......................... 521/64; 521/99; 521/112; 521/154; 528/21; 528/34; 525/342; 525/446

(58) Field of Classification Search .................. 528/21, 528/34; 525/342, 446; 521/64, 99, 112, 521/154
See application file for complete search history.

(56) References Cited

U.S. PATENT DOCUMENTS

| | | | |
|---|---|---|---|
| 4,634,509 A | 1/1987 | Shimizu et al. | |
| 5,494,859 A | 2/1996 | Kapoor | |
| 5,707,783 A | 1/1998 | Stauffer et al. | |
| 6,020,446 A * | 2/2000 | Okamoto et al. | 526/279 |
| 6,037,275 A | 3/2000 | Wu et al. | |
| 6,197,913 B1 | 3/2001 | Zhong | |
| 6,313,045 B1 | 11/2001 | Zhong et al. | |
| 6,359,096 B1 | 3/2002 | Zhong et al. | |
| 6,376,634 B1 | 4/2002 | Nishikawa et al. | |
| 6,391,999 B1 | 5/2002 | Crivello | |
| 6,413,647 B1 | 7/2002 | Hayashi et al. | |
| 6,495,264 B2 * | 12/2002 | Hayashi et al. | 428/447 |
| 6,512,071 B1 | 1/2003 | Hacker et al. | |
| 6,533,855 B1 | 3/2003 | Gaynor et al. | |
| 6,534,025 B1 | 3/2003 | Yano et al. | |
| 6,596,404 B1 | 7/2003 | Albaugh et al. | |
| 6,632,489 B1 | 10/2003 | Watanabe et al. | |
| 6,639,015 B1 | 10/2003 | Nakashima et al. | |
| 6,696,538 B2 | 2/2004 | Ko et al. | |
| 2002/0020327 A1 | 2/2002 | Hayashi et al. | |
| 2002/0098279 A1 | 7/2002 | Lyu et al. | |
| 2002/0155053 A1 | 10/2002 | Nishiyama et al. | |
| 2002/0160207 A1 | 10/2002 | Kohmura et al. | |
| 2003/0064321 A1 | 4/2003 | Malik et al. | |
| 2003/0091838 A1 | 5/2003 | Hayashi et al. | |
| 2003/0104225 A1 | 6/2003 | Shiota et al. | |
| 2003/0157311 A1 | 8/2003 | MacDougall et al. | |

FOREIGN PATENT DOCUMENTS

| | | |
|---|---|---|
| EP | 1 205 438 A1 | 5/2002 |
| EP | 1223192 | 7/2002 |
| EP | 1245642 | 10/2002 |
| EP | 1 123 753 A2 | 8/2003 |
| JP | 63-015355 | 4/1988 |
| JP | 05-125191 | 5/1993 |
| JP | 06-145599 | 5/1994 |
| JP | 9-194298 | 7/1997 |
| JP | 11-246665 | 9/1999 |
| JP | 2000-44875 | 2/2000 |
| JP | 2000-309751 | 11/2000 |
| JP | 2000-309753 | 11/2000 |
| JP | 2000-345041 | 12/2000 |
| JP | 2001-002993 | 1/2001 |
| JP | 2001-049178 | 2/2001 |

(Continued)

OTHER PUBLICATIONS

Burkett et al., "Synthesis Of Hybrid Inorganic-Organic Mesoporous Silica By Co-Condensation Of Siloxane And Organosiloxane Precursors," *J. Chem. Soc. Chem. Commun.*, 1996, 1367-1368.

(Continued)

*Primary Examiner*—Irina S. Zemel
(74) *Attorney, Agent, or Firm*—Alston & Bird, LLP

(57) ABSTRACT

Provided is a coating liquid for forming a porous film having desirably controlled thickness and having excellent dielectric and mechanical properties, using the conventional semiconductor process. Specifically, provided is a composition for forming a porous film comprising a condensation product and an organic solvent wherein the condensation product is obtained by hydrolysis and condensation, at presence of a basic catalyst, of one or more silane compounds represented by formula (1): $R^1{}_k Si(OR^2)_{4-k}$, and one or more crosslinking agents represented by formula (2): $\{X_j(Y)_{3-j}Si\text{-}(L)_m\text{-}\}_n MZ_{4-n}$.

Moreover, a method for manufacturing a porous film comprising steps of applying said composition so as to form a film, drying the film and heating the dried film so as to harden the film, and others are provided.

10 Claims, 1 Drawing Sheet

FOREIGN PATENT DOCUMENTS

| | | |
|---|---|---|
| JP | 2001-049179 | 2/2001 |
| JP | 2001-055554 | 2/2001 |
| JP | 2001-080915 | 3/2001 |
| JP | 2001-98218 | 4/2001 |
| JP | 2001-115021 | 4/2001 |
| JP | 2001-115028 | 4/2001 |
| JP | 2001-115029 | 4/2001 |
| JP | 2001-130911 | 5/2001 |
| JP | 2001-131479 | 5/2001 |
| JP | 2001-157815 | 6/2001 |
| JP | 2001-164186 | 6/2001 |
| JP | 2001-203197 | 7/2001 |
| JP | 2001-240798 | 9/2001 |
| JP | 2002-20688 | 1/2002 |
| JP | 2002-020689 A | 1/2002 |
| JP | 2002-023354 | 1/2002 |
| JP | 2002-030249 A | 1/2002 |
| JP | 2002-038090 A | 2/2002 |
| WO | WO 00/12640 | 3/2000 |
| WO | WO 03/088344 | 10/2003 |

OTHER PUBLICATIONS

Inagaki et al., "Synthesis Of Highly Ordered Mesoporous Materials From A Layered Polysilicate", *J. Chem. Soc. Chem. Commun.*, 1993, pp. 680-682.

\* cited by examiner

COMPOSITION FOR FORMING POROUS FILM, POROUS FILM AND METHOD FOR FORMING THE SAME, INTERLEVEL INSULATOR FILM, AND SEMICONDUCTOR DEVICE

BACKGROUND OF THE INVENTION

1. Field of the Invention

The present invention relates to a composition for film formation which can be formed into a porous film that excels in dielectric properties, adhesion, film uniformity and mechanical strength, and has reduced moisture absorption; a porous film and a method for forming the same; and a semiconductor device which contains the porous film inside.

2. Description of the Related Art

In the fabrication of semiconductor integrated circuits, as the circuits are packed tighter, an increase in interconnection capacitance, which is a parasitic capacitance between metal interconnections, leads to an increase in interconnection delay time, thereby hindering the enhancement of the performance of semiconductor circuits. The interconnection delay time is called an RC delay which is in proportion to the product of the electric resistance of the metal interconnections and the static capacitance between the interconnections. Reducing the interconnection delay time requires reducing the resistance of metal interconnections or the interconnection capacitance.

The reduction in resistance of the interconnection metal and the interconnection capacitance can prevent a densely packed semiconductor device from causing an interconnection delay, thereby realizing a smaller and faster semiconductor device with reduced power consumption.

In an attempt to reduce the resistance of metal interconnections, in recent years, metallic copper interconnections have been employed more than conventional aluminum interconnections in the structure of a multilayered interconnection. However, use of this structure alone has limits in the enhancement of the performance, so the reduction in interconnection capacitance is an urgent necessity for higher performance of semiconductors.

One method for reducing interconnection capacitance is to reduce the relative permittivity (dielectric constant) of an interlevel insulator film disposed between metal interconnections. As such an insulator film with a low relative permittivity, it has been considered to use a porous film instead of a silicon oxide film which has been used conventionally. A porous film can be said to be the only practical film as a material with a relative permittivity of 2.0 or less, and various methods for forming a porous film have been proposed.

A first method for forming a porous film is as follows: a precursor solution of a siloxane polymer containing a thermally unstable organic component is synthesized; then the precursor solution is applied on the substrate to form a coating film; and later, a heat treatment is applied to decompose and volatilize the organic component. The result is a number of micro-pores formed in the film.

As a second method for forming a porous film, it is well known to carry out processing as follows: a silica sol solution is applied onto a substrate by coating or using a CVD method so as to form a wet gel; and then the silica sol is subjected to a condensation reaction while restricting volume reduction by controlling the speed of the evaporation of the solvent from the wet gel.

As a third method for forming a porous film, it is well known that a silica micro-particle solution is applied on a substrate to form a coating film, and then the coating film is sintered to form a number of micro-pores between silica micro-particles.

As a fourth method, Japanese Patent Provisional Publication No. 2000-44875 proposes a composition for porous film formation which is characterized by containing a compound having (A) a component expressed by $(R')_n Si(OR'')_{4-n}$ (R' and R'' are univalent organic radicals, and m is an integer of 0 to 2); (B) a metal chelate compound; and (C) a compound having a polyalkylene oxide structure.

However, these methods have respective major drawbacks as follows.

In the first method for forming a porous film, the synthesis of the precursor solution of the siloxane polymer increases the cost. In addition, the formation of the coating film by coating the precursor solution increases the amount of silanol groups remaining in the coating film, which causes a degassing phenomenon indicating the evaporation of water and the like in the heat treatment process that is conducted later and which also deteriorates the film quality due to the porous film absorbing humidity.

In the second method for forming a porous film, the speed control of the evaporation of the solvent from the wet gel requires a special type of coating device, which increases the cost. In addition, a significant amount of silanol remains on the surface of the micro-pores which must be silanized because otherwise hygroscopicity is high so that the film quality decreases. The silanization makes the process more complicated. In the case where a wet gel is formed by the CVD process, it is necessary to use a special type of CVD device which is different from the plasma CVD device generally used in the semiconductor process, thereby also increasing the cost.

In the third method for forming a porous film, the diameter of the micro-pores formed between the silica micro-particles, which is determined by the accumulation structure of the silica micro-particles that are accumulated geometrically, becomes very large. This makes it difficult to set the relative permittivity of the porous film to 2 or below.

In the case of the fourth method, out of the three components (A), (B), and (C), the metal chelate compound of (B) is essential to increase the compatibility of the components (A) and (C), and to make the thickness of the coating film uniform after being hardened. However, it is not preferable because it makes the manufacturing process complicated and increases the cost. Therefore, it is desired to develop a material which enables a homogeneous solution to be formed without a chelate component and the coating film to be flat after being hardened.

In comparison to the conventional method for forming a porous film, it has been found that a porous member having a channel structure of mesopore size (micro-pores with diameters of 2 to 50 nm) can be formed as follows: alumino silicate, silica, or the like is condensed while using a micelle made from a surface active agent as a mold so as to form the structure, and then the surface active agent component is removed by sintering or solvent extraction. For example, Inagaki et al. propose making polysilicates react in water while using a surface active agent as a mold (J. Chem. Soc. Chem. Commun., p. 680, 1993). Furthermore, Japanese Patent Provisional Publication No. 9-194298 discloses that tetraalkoxysilane is reacted in acid conditions in water while using a surface active agent as a mold, and is applied onto the substrate so as to form a silica porous film having micro-pores of diameters of 1 to 2 nm.

However, these methods have problems as follows. In the first method, the powdered porous member can be easily formed, but it is impossible to form a porous film as a thin film on the substrate which is used for the fabrication of semiconductor devices. In the second method, a porous member can be formed into a thin film, but it is impossible to control the orientation of micro-pores, and it is also impossible to form a uniform thin film in a wide area.

Japanese Patent Provisional Publication No. 2001-130911 discloses a method for forming a silica mesoporous thin film by using a mixture of an acid hydrolysis condensate of a silicon alkoxide and a surface active agent after adjusting the mixture to pH3 or below for stabilization.

However, in this method, too, the restriction of the solute concentration makes it difficult to properly control the thickness of a coating film, thereby making it difficult to apply it to a practical semiconductor fabrication process. When this solution is diluted with water, the thickness of the coating film becomes controllable, but the speed of polycondensation of the silica component increases to lose stability of the coating solution.

On the other hand, Japanese Patent Provisional Publication Nos. 2001-115029 and 2001-203197 show that a coating solution excellent in dielectric properties is prepared by hydrolysis and condensation of a silane compound. Because it is considered that a coefficient of elasticity must be 5 GPa or higher for use in an actual semiconductor fabrication process, these inventions cannot be said to be satisfactory for mechanical strength.

As mentioned above, the conventional materials have several problems such as deterioration of the film quality during the heat treatment step and high cost. Moreover, the formation of the porous film results in pores having a large diameter so that it is difficult to obtain the low dielectric constant. When the conventional porous film is incorporated into the multilayer interconnection of the semiconductor device as an insulator film, there is a problem that the mechanical strength necessary for the semiconductor device is not obtained.

Thus, when the dielectric constant of the porous film used as an insulator film in the multilayer interconnection of the semiconductor device is too high, the RC delay in the multilayer interconnection of the semiconductor device is increased so that the performance of the semiconductor device (high speed and low power consumption) cannot be improved. This represent large problems. Furthermore, a porous film with a low mechanical strength deteriorates the reliability of the semiconductor device.

SUMMARY OF THE INVENTION

Looking at the problems described above, the purpose of this invention is to provide the coating liquid for forming a a porous film having superb mechanical strength and excellent dielectric properties, wherein the thin film having a desirably controlled thickness can be easily formed using a conventional method of semiconductor processing. Another purpose for the present invention is to provide a high-performing and highly reliable semiconductor device which contains the porous film inside.

Up to now, in the manufacturing field of low dielectric constant insulating films, most of low dielectric constant inslulating films are formed by hydrolysis and condensation of a raw material of an alkoxysilane compound or a halogenated silane compound in the presence of acid or base catalyst.

It is especially common that the coated film is obtained from a condensation product which has been produced by the hydrolysis and condensation of an alkoxysilane compound at the presence of a basic catalyst. In this process, addition of the silicon-containing crosslinking agent (hereafter, "crosslinking agent") is proposed in many ways to improve the mechanical strength of the coated film. For instance, many methods are found in patent publications such as Japanese Patent Provisional Publication No. 2001-354904 and Japanese Patent Provisional Publication No. 2002-20688. However, it is found that the conventional crosslinking agent cannot attain the sufficient mechanical strength of the film because one molecule of the crosslinking agent has only two functional silicon atoms which can crosslink the polymers produced by the hydrolysis and condensation.

According to the invention, the crosslinking agent having three or four functional silicon atoms per molecule thereof is added so that the mechanical strength is increased. Thus, a composition for forming a porous film having mechanical strength and dielectric properties sufficient for the manufacturing process of semiconductors is found together with the method for forming the porous film. The invention is completed by these findings.

According to the invention, provided is a composition for forming a porous film comprising a condensation product and an organic solvent wherein the condensation product is obtained by hydrolysis and condensation, in the presence of a basic catalyst, of one or more silane compounds represented by formula (1): $R^1_k Si\ (OR^2)_{4-k}$ wherein $R^1$ represents an organic group having 1 to 8 carbons, and when there are two or more $R^1$s, the $R^1$s may be independently same or different; $R^2$ represents an alkyl group having 1 to 4 carbons, and when there are two or more $R^2$s, $R^2$s may be independently same or different; and k is an integer from 0 to 3;

and one or more crosslinking agents represented by formula (2): $\{X_j(Y)_{3-j}Si\text{-}(L)_m\text{-}\}_n MZ_{4-n}$ wherein X represents a hydrogen atom, a halogen atom or an alkoxy group having 1 to 4 carbons; Y represents a hydrogen atom, an alkyl group having 1 to 4 carbons or a phenyl; Z represents a hydrogen atom, a halogen atom, an alkyl group having 1 to 4 carbons, an alkoxy group having 1 to 4 carbons or a phenyl; L represents a linear or branched alkylene group having 1 to 6 carbons, an alkenylene having 1 to 6 carbons, an alkynylene having 1 to 6 carbons or a phenylene group; M represents a carbon atom or a silicon atom; j is an integer from 1 to 3; m is 0 or 1; and n is 3 or 4.

According to the invention, provided is a method for manufacturing a porous film comprising steps of applying said composition to a substrate so as to form a film thereon, drying the film and heating the dried film so as to harden (cure) the film. These can be applied to the semiconductor manufacturing process, providing an interlevel (interlayer) insulating film which excels in dielectric properties and mechanical strength.

The semiconductor device of the invention comprises a porous film therein, the porous film being formed by a composition comprising a condensation product and an organic solvent wherein the condensation product is obtained by hydrolysis and condensation, in the presence of a basic catalyst, of one or more silane compounds represented by formula (1): $R^1_k Si(OR^2)_{4-k}$ wherein $R^1$ represents an organic group having 1 to 8 carbons, and when there are two or more $R^1$s, the $R^1$s may be independently same or different; $R^2$ represents an alkyl group having 1 to 4 carbons, and when there are two or more $R^2$s, the $R^2$s may be independently same or different; and k is an integer from 0 to 3;

and one or more crosslinking agents represented by formula (2): $\{X_j(Y)_{3-j}Si\text{-}(L)_m\text{-}\}_n MZ_{4-n}$ wherein X represents a hydrogen atom, a halogen atom or an alkoxy group having 1 to 4 carbons; Y represents a hydrogen atom, an alkyl group having 1 to 4 carbons or a phenyl; Z represents a hydrogen atom, a halogen atom, an alkyl group having 1 to 4 carbons, an alkoxy group having 1 to 4 carbons or a phenyl; L represents a linear or branched alkylene group having 1 to 6 carbons, an alkenylene having 1 to 6 carbons, an alkynylene having 1 to 6 carbons or a phenylene group; M represents a carbon atom or a silicon atom; j is an integer from 1 to 3; m is 0 or 1; and n is 3 or 4.

Specifically, said porous film may be used as an insulating film between the multilayer interconnection in the semiconductor device.

Thus, keeping the mechanical strength of the semiconductor device secured, the hygroscopic property of the porous film is decreased. Hence, the semiconductor device with a built-in insulator film which has a low dielectric constant is obtained. Because of lowering dielectric constant of the insulator film, the parasitic capacitance of the area around the multilayer interconnection is decreased, leading to the high-speed operation and low power consumption of the semiconductor device.

Moreover, it is preferable for the semiconductor device of the invention that said porous film is between metal interconnections in a same layer of multi-level interconnects, or is between upper and lower metal interconnection layers. This arrangement can achieve a high-performing and highly reliable semiconductor device.

Use of the composition for forming a porous film of the invention can facilitate the formation of a porous film having a properly controlled thickness. This porous film has a low dielectric constant, and excels in adhesion, film uniformity and mechanical strength. In addition, use of the porous film formed by the composition of the invention as the insulating film of the multilayered interconnections can achieve a high-performing and highly reliable semiconductor device.

DETAILED DESCRIPTION OF THE PREFERRED EMBODIMENTS

Figure 1:
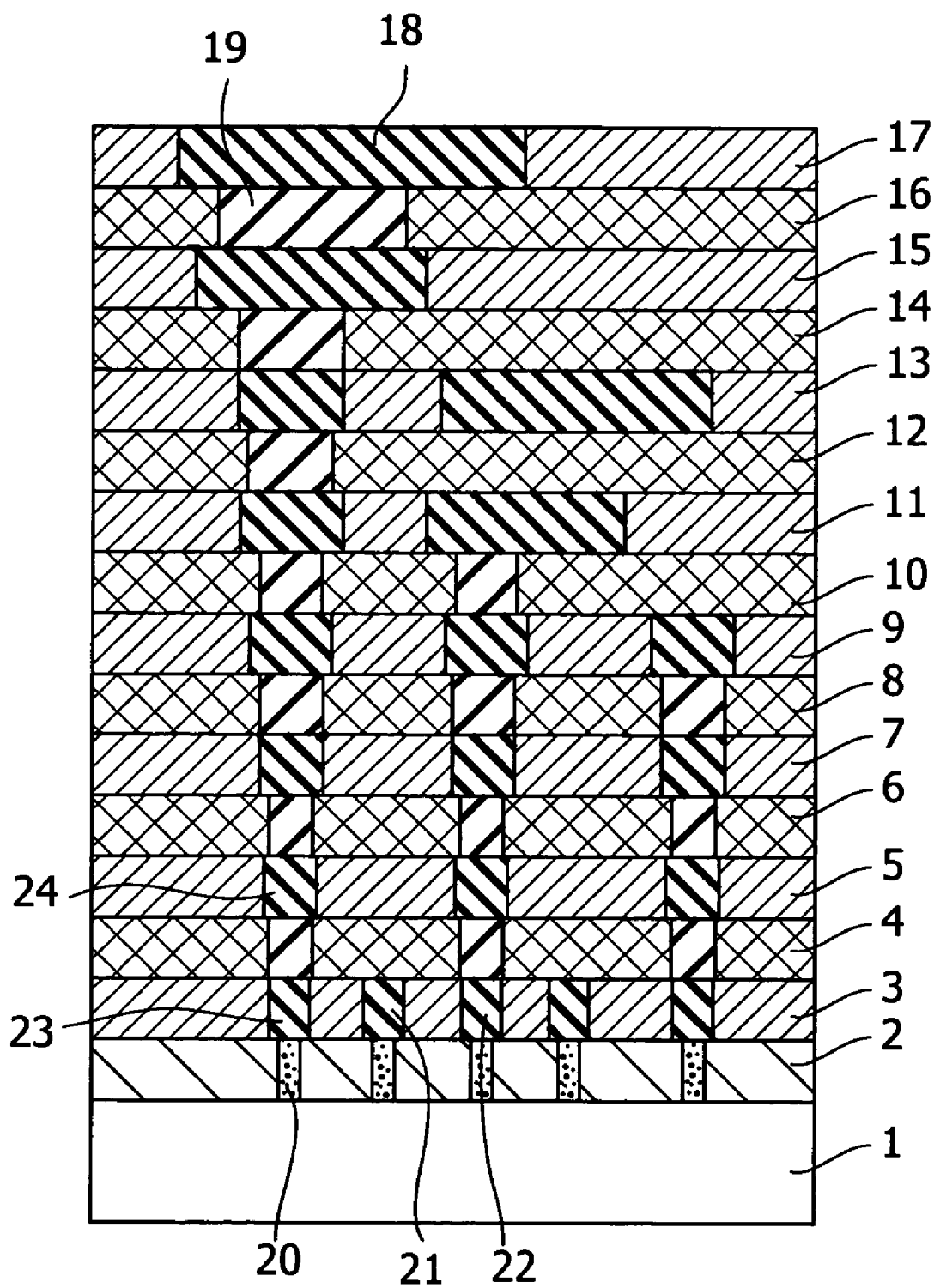
FIG. 1 is a schematic cross-sectional view of a semiconductor device of the present invention.

In formula (1), used for this invention, $R^1$ represents an organic group having 1 to 8 carbons. The organic group may include an alkyl group, alkenyl group, alkynyl group, an aromatic group, or one or more hydrogen atoms of the group replaced by a group such as a hydroxy group, alkoxy group, amino group, alkylamino group or dialkylamino group. The organic group can include methyl, ethyl, propyl, isopropyl, n-butyl, isobutyl, sec-butyl, t-butyl, pentyl, cyclopentyl, hexyl, cyclohexyl, heptyl, norbornyl, octyl, vinyl, allyl, ethynyl, propargyl, phenyl, toryl, 3-methoxypropyl, 3-ethoxypropyl, 3-propylpropyl, 4-methoxybutyl, 4-ethoxybutyl, 4-propylbutyl, 3-methylaminopropyl, 3-ethylaminopropyl, 3-propylaminopropyl, 4-methylaminobutyl, 4-ethylaminobutyl, 4-propylaminobutyl, 3-(N,N-dimethylamino)propyl, 3-(N,N-diethylamino)propyl, 4-(N,N-dimethylamino)butyl, 4-(N,N-diethylamino)butyl and 4-methoxyphenyl.

The silane compounds represented by formula (1) used in this invention may preferably include, but are not limited to, tetramethoxysilane, tetraethoxysilane, tetrapropoxysilane, tetrabutoxysilane, methyltrimethoxysilane, methyltriethoxysilane, methyltripropoxysilane, ethyltrimethoxysilane, propyltrimethoxysilane, butyltrimethoxysilane, pentyltrimethoxysilane, hexyltrimethoxysilane, 2-ethylhexyltrimethoxysilane, phenyltrimethoxysilane, dimethyldimethoxysilane, dimethyldiethoxysilane, trimethylmethoxysilane, triethylmethoxysilane and butyldimethylmethoxysilane.

The crosslinking agent represented by formula (2) used in this invention may include, but are not limited to, trisilylmethane, tri(methylsilyl)methane, tri(phenylsilyl)methane, tris(dimethoxysilyl)methane, tris(trimethoxysilyl)methane, tris(dimethoxymethylsilyl)methane, tris(dimethoxyphenylsilyl)methane, tris(dimethoxysilylmethyl)methane, tris(trimethoxysilylmethyl)methane, tris(dimethoxymethylsilylmethyl)methane, tris(dimethoxyphenylsilylmethyl)methane, tris(1-(dimethoxysilyl)ethyl)methane, tris(1-(trimethoxysilyl)ethyl)methane, tris(1-(dimethoxymethylsilyl)ethyl)methane, tris(1-(dimethoxyphenylsilyl)ethyl)methane, tris(2-(dimethoxysilyl)ethyl)methane, tris(2-(trimethoxysilyl)ethyl)methane, tris(2-(dimethoxymethylsilyl)ethyl)methane, tris(2-(dimethoxyphenylsilyl)ethyl)methane, tris(2-dimethoxysilyl)propyl)methane, tris(2-(trimethoxysilyl)propyl)methane, tris(2-(dimethoxymethylsilyl)propyl)methane, tris(2-(dimethoxyphenylsilyl)propyl)methane, tris(3-(dimethoxysilyl)propyl)methane, tris(3-(trimethoxysilyl)propyl)methane, tris(3-(dimethoxymethylsilyl)propyl)methane, tris(3-(dimethoxyphenylsilyl)propyl)methane, tris(4-(dimethoxysilyl)butyl)methane, tris(4-(trimethoxysilyl)butyl)methane, tris(4-(dimethoxymethylsilyl)butyl)methane, tris(4-(dimethoxyphenylsilyl)butyl)methane, tris(5-(dimethoxysilyl)pentyl)methane, tris(5-(trimethoxysilyl)pentyl)methane, tris(5-(dimethoxymethylsilyl)pentyl)methane, tris(5-(dimethoxyphenylsilyl)pentyl)methane, tris(6-(dimethoxysilyl)hexyl)methane, tris(6-(trimethoxysilyl)hexyl)methane, tris(6-(dimethoxymethylsilyl)hexyl)methane, tris(6-(dimethoxyphenylsilyl)hexyl)methane, tris(2-(dimethoxysilyl)ethynyl)methane, tris(2-(trimethoxysilyl)ethynyl)methane, tris(2-(dimethoxymethylsilyl)ethynyl)methane, tris(2-(dimethoxyphenylsilyl)ethynyl)methane, tris(4-(dimethoxysilyl)phenyl)methane, tris(4-(trimethoxysilyl)phenyl)methane, tris(4-(dimethoxymethylsilyl)phenyl)methane, tris(4-(dimethoxyphenylsilyl)phenyl)methane, 1,1,1-tris(dimethoxysilyl)ethane, 1,1,1-tris(trimethoxysilyl)ethane, 1,1,1-tris(dimethoxymethylsilyl)ethane, 1,1,1-tris(dimethoxyphenylsilyl)ethane, 1,1,1-tris(dimethoxysilylmethyl)ethane, 1,1,1-tris(trimethoxysilylmethyl)ethane, 1,1,1-tris(dimethoxymethylsilylmethyl)ethane, 1,1,1-tris(dimethoxyphenylsilylmethyl)ethane, 1,1,1-tris(1-(dimethoxysilyl)ethyl)ethane, 1,1,1-tris(1-(trimethoxysilyl)ethyl)ethane, 1,1,1-tris(1-(dimethoxymethylsilyl)ethyl)ethane, 1,1,1-tris(1-(dimethoxyphenylsilyl)ethyl)ethane, 1,1,1-tris(2-(dimethoxysilyl)ethyl)ethane, 1,1,1-tris(2-(trimethoxysilyl)ethyl)ethane, 1,1,1-tris(2-(dimethoxyphenylsilyl)ethyl)ethane, 1,1,1-tris(2-(dimethoxyphenylsilyl)ethyl)ethane, 1,1,1-tris(2-(dimethoxysilyl)propyl)ethane, 1,1,1-tris(2-(trimethoxysilyl)propyl)ethane, 1,1,1-tris(2-(dimethoxyphenylsilyl)propyl)ethane, 1,1,1-tris(2-(dimethoxyphenylsilyl)propyl)ethane, 1,1,1-tris(3-(dimethoxysilyl)propyl)ethane, 1,1,1-tris(3-(trimethoxysilyl)propyl)ethane, 1,1,1-tris(3-(dimethoxymethylsilyl)propyl)ethane, 1,1,1-tris(3-(dimethoxyphenylsilyl)propyl)ethane, 1,1,1-tris(4-

(dimethoxysilyl)butyl)ethane, 1,1,1-tris(4-(trimethoxysilyl)butyl)ethane, 1,1,1-tris(4-(dimethoxymethylsilyl)butyl)ethane, 1,1,1-tris(4-(dimethoxyphenylsilyl)butyl)ethane, 1,1,1-tris(5-(dimethoxysilyl)pentyl)ethane, 1,1,1-tris(5-(trimethoxysilyl)pentyl)ethane, 1,1,1-tris(5-(dimethoxymethylsilyl)pentyl)ethane, 1,1,1-tris(5-(dimethoxyphenylsilyl)phenyl)ethane, 1,1,1-tris(6-(dimethoxysilyl)hexyl)ethane, 1,1,1-tris(6-(trimethoxysilyl)hexyl)ethane, 1,1,1-tris(6-(dimethoxymethylsilyl)hexyl)ethane, 1,1,1-tris(6-(dimethoxyphenylsilyl)hexyl)ethane, 1,1,1-tris(2-(dimethoxysilyl)ethynyl)ethane, 1,1,1-tris(2-(trimethoxysilyl)ethynyl)ethane, 1,1,1-tris(2-(dimethoxymethylsilyl)ethynyl)ethane, 1,1,1-tris(2-(dimethoxyphenylsilyl)ethynyl)ethane, 1,1,1-tris(4-(dimethoxysilyl)phenyl)ethane, 1,1,1-tris(4-(trimethoxysilyl)phenyl)ethane, 1,1,1-tris(4-(dimethoxymethylsilyl)phenyl)ethane, 1,1,1-tris(4-(dimethoxyphenylsilyl)phenyl)ethane, α,α,α-tris(dimethoxysilyl)toluene, α,α,α-tris(trimethoxysilyl)toluene, α,α,α-tris(dimethoxymethylsilyl)toluene, α,α,α-tris(dimethoxyphenylsilyl)toluene, α,α,α-tris(dimethoxysilylmethyl)toluene, α,α,α-tris(trimethoxysilylmethyl)toluene, α,α,α-tris(dimethoxymethylsilylmethyl)toluene, α,α,α-tris(dimethoxyphenylsilylmethyl)toluene, α,α,α-tris(2-(dimethoxysilyl)ethyl)toluene, α,α,α-tris(2-(trimethoxysilyl)ethyl)toluene, α,α,α-tris(2-(dimethoxymethylsilyl)ethyl)toluene, α,α,α-tris(2-(dimethoxyphenylsilyl)ethyl)toluene, α,α,α-tris(3-(dimethoxysilyl)propyl)toluene, α,α,α-tris(3-(trimethoxysilyl)propyl)toluene, α,α,α-tris(3-(dimethoxymethylsilyl)propyl)toluene, α,α,α-tris(3-(dimethoxyphenylsilyl)propyl)toluene, α,α,α-tris(4-(dimethoxysilyl)butyl)toluene, α,α,α-tris(4-(trimethoxysilyl)butyl)toluene, α,α,α-tris(4-(dimethoxymethylsilyl)butyl)toluene, α,α,α-tris(4-(dimethoxyphenylsilyl)butyl)toluene, tetrakis(dimethoxysilyl)methane, tetrakis(trimethoxysilyl)methane, tetrakis(dimethoxymethylsilyl)methane, tetrakis(dimethoxyphenylsilyl)methane, tetrakis(dimethoxysilylmethyl)methane, tetrakis(trimethoxysilylmethyl)methane, tetrakis(dimethoxymethylsilylmethyl)methane, tetrakis(dimethoxyphenylsilylmethyl)methane, tetrakis(2-(dimethoxysilyl)ethyl)methane, tetrakis(2-(trimethoxysilyl)ethyl)methane, tetrakis(2-(dimethoxymethylsilyl)ethyl)methane, tetrakis(2-(dimethoxyphenylsilyl)ethyl)methane, tetrakis(3-(dimethoxysilyl)propyl)methane, tetrakis(3-(trimethoxysilyl)propyl)methane, tetrakis(3-(dimethoxymethylsilyl)propyl)methane, tetrakis(3-(dimethoxyphenylsilyl)propyl)methane, tetrakis(4-(dimethoxysilyl)butyl)methane, tetrakis(4-(trimethoxysilyl)butyl)methane, tetrakis(4-(dimethoxymethylsilyl)butyl)methane, tetrakis(4-(dimethoxyphenylsilyl)butyl)methane, tetrakis(5-(dimethoxysilyl)pentyl)methane, tetrakis(5-(trimethoxysilyl)pentyl)methane, tetrakis(5-(dimethoxymethylsilyl)pentyl)methane, tetrakis(5-(dimethoxyphenylsilyl)pentyl)methane, tetrakis(6-(dimethoxysilyl)hexyl)methane, tetrakis(6-(trimethoxysilyl)hexyl)methane, tetrakis(6-(dimethoxymethylsilyl)hexyl)methane, tetrakis(6-(dimethoxyphenylsilyl)hexyl)methane, tetrakis(4-(dimethoxysilyl)phenyl)methane, tetrakis(4-(trimethoxysilyl)phenyl)methane, tetrakis(4-(dimethoxymethylsilyl)phenyl)methane, tetrakis(4-(dimethoxyphenylsilyl)phenyl)methane, tris(dimethoxysilylmethyl)silane, tris(trimethoxysilylmethyl)silane, tris(dimethoxymethylsilylmethyl)silane, tris(dimethoxyphenylsilylmethyl)silane, tris(1-(dimethoxysilyl)ethyl)silane, tris(1-(trimethoxysilyl)ethyl)silane, tris(1-(dimethoxymethylsilyl)ethyl)silane, tris(1-(dimethoxyphenylsilyl)ethyl)silane, tris(2-(dimethoxysilyl)ethyl)silane, tris(2-(trimethoxysilyl)ethyl)silane, tris(2-(dimethoxymethylsilyl)ethyl)silane, tris(2-(dimethoxyphenylsilyl)ethyl)silane, tris(2-(dimethoxysilyl)propyl)silane, tris(2-(trimethoxysilyl)propyl)silane, tris(2-(dimethoxymethylsilyl)propyl)silane, tris(2-(dimethoxyphenylsilyl)propyl)silane, tris(3-(dimethoxysilyl)propyl)silane, tris(3-(trimethoxysilyl)propyl)silane, tris(3-(dimethoxymethylsilyl)propyl)silane, tris(3-(dimethoxyphenylsilyl)propyl)silane, tris(4-(dimethoxysilyl)butyl)silane, tris(4-(trimethoxysilyl)butyl)silane, tris(4-(dimethoxymethylsilyl)butyl)silane, tris(4-(dimethoxyphenylsilyl)butyl)silane, tris(5-(dimethoxysilyl)pentyl)silane, tris(5-(trimethoxysilyl)pentyl)silane, tris(5-(dimethoxymethylsilyl)pentyl)silane, tris(5-(dimethoxyphenylsilyl)pentyl)silane, tris(6-(dimethoxysilyl)hexyl)silane, tris(6-(trimethoxysilyl)hexyl)silane, tris(6-(dimethoxymethylsilyl)hexyl)silane, tris(6-(dimethoxyphenylsilyl)hexyl)silane, tris(2-(dimethoxysilyl)ethynyl)silane, tris(2-(trimethoxysilyl)ethynyl)silane, tris(2-(dimethoxymethylsilyl)ethynyl)silane, tris(2-(dimethoxyphenylsilyl)ethynyl)silane, tris(4-(dimethoxysilyl)phenyl)silane, tris(4-(trimethoxysilyl)phenyl)silane, tris(4-(dimethoxymethylsilyl)phenyl)silane, tris(4-(dimethoxyphenylsilyl)phenyl)silane, tris(dimethoxysilylmethyl)methoxysilane, tris(trimethoxysilylmethyl)methoxysilane, tris(dimethoxymethylsilylmethyl)methoxysilane, tris(dimethoxyphenylsilylmethyl)methoxysilane, tris(1-(dimethoxysilyl)ethyl)methoxysilane, tris(1-(trimethoxysilyl)ethyl)methoxysilane, tris(1-(dimethoxymethylsilyl)ethyl)methoxysilane, tris(1-(dimethoxyphenylsilyl)ethyl)methoxysilane, tris(2-(dimethoxysilyl)ethyl)methoxysilane, tris(2-(trimethoxysilyl)ethyl)methoxysilane, tris(2-(dimethoxymethylsilyl)ethyl)methoxysilane, tris(2-(dimethoxyphenylsilyl)ethyl)methoxysilane, tris(2-(dimethoxysilyl)propyl)methoxysilane, tris(2-(trimethoxysilyl)propyl)methoxysilane, tris(2-(dimethoxymethylsilyl)pripyl)methoxysilane, tris(2-(dimethoxyphenylsilyl)propyl)methoxysilane, tris(3-(dimethoxysilyl)propyl)methoxysilane, tris(3-(trimethoxysilyl)propyl)methoxysilane, tris(3-(dimethoxymethylsilyl)propyl)methoxysilane, tris(3-(dimethoxyphenylsilyl)propyl)methoxysilane, tris(4-(dimethoxysilyl)butyl)methoxysilane, tris(4-(trimethoxysilyl)butyl)methoxysilane, tris(4-(dimethoxymethylsilyl)butyl)methoxysilane, tris(4-(dimethoxyphenylsilyl)butyl)methoxysilane, tris(5-(dimethoxysilyl)pentyl)methoxysilane, tris(5-(trimethoxysilyl)pentyl)methoxysilane, tris(5-(dimethoxymethylsilyl)pentyl)methoxysilane, tris(5-(dimethoxyphenylsilyl)pentyl)methoxysilane, tris(6-(dimethoxysilyl)hexyl)methoxysilane, tris(6-(trimethoxysilyl)hexyl)methoxysilane, tris(6-(dimethoxymethylsilyl)hexyl)methoxysilane, tris(6-(dimethoxyphenylsilyl)hexyl)methoxysilane, tris(2-(dimethoxysilyl)ethynyl)methoxysilane, tris(2-(trimethoxysilyl)ethynyl)methoxysilane, tris(2-(dimethoxymethylsilyl)ethynyl)methoxysilane, tris(2-(dimethoxyphenylsilyl)ethynyl)methoxysilane, tris(4-(dimethoxysilyl)phenyl)methoxysilane, tris(4-(trimethoxysilyl)phenyl)methoxysilane, tris(4-(dimethoxymethylsilyl)phenyl)methoxysilane, tris(4-(dimethoxyphenylsilyl)phenyl)methoxysilane, tris(dimethoxysilylmethyl)methylsilane, tris(trimethoxysilylmethyl)methylsilane, tris(dimethoxymethylsilylmethyl)methylsilane, tris(dimethoxyphenylsilylmethyl)methylsilane, tris(1-(dimethoxysilyl)ethyl)methylsilane, tris(1-(trimethoxysilyl)

ethyl)methylsilane, tris(1-(dimethoxymethylsilyl)ethyl)methylsilane, tris(1-(dimethoxyphenylsilyl)ethyl)methylsilane, tris(2-(dimethoxysilyl)ethyl)methylsilane, tris(2-(trimethoxysilyl)ethyl)methylsilane, tris(2-(dimethoxymethylsilyl)ethyl)methylsilane, tris(2-(dimethoxyphenylsilyl)ethyl)methylsilane, tris(2-(dimethoxysilyl)propyl)methylsilane, tris(2-(trimethoxysilyl)propyl)methylsilane, tris(2-(dimethoxymethylsilyl)propyl)methylsilane, tris(2-(dimethoxyphenylsilyl)propyl)methylsilane, tris(3-(dimethoxysilyl)propyl)methylsilane, tris(3-(trimethoxysilyl)propyl)methylsilane, tris(3-(dimethoxymethylsilyl)propyl)methylsilane, tris(3-(dimethoxyphenylsilyl)propyl)methylsilane, tris(4-(dimethoxysilyl)butyl)methylsilane, tris(4-(trimethoxysilyl)butyl)methylsilane, tris(4-(dimethoxymethylsilyl)butyl)methylsilane, tris(4-(dimethoxyphenylsilyl)butyl)methylsilane, tris(5-(dimethoxysilyl)pentyl)methylsilane, tris(5-(trimethoxysilyl)pentyl)methylsilane, tris(5-(dimethoxymethylsilyl)pentyl)methylsilane, tris(5-(dimethoxyphenylsilyl)pentyl)methylsilane, tris(6-(dimethoxysilyl)hexyl)methylsilane, tris(6-(trimethoxysilyl)hexyl)methylsilane, tris(6-(dimethoxymethylsilyl)hexyl)methylsilane, tris(6-(dimethoxyphenylsilyl)hexyl)methylsilane, tris(2-(dimethoxysilyl)ethynyl)methylsilane, tris(2-(trimethoxysilyl)ethynyl)methylsilane, tris(2-(dimethoxymethylsilyl)ethynyl)methylsilane, tris(2-(dimethoxyphenylsilyl)ethynyl)methylsilane, tris(4-(dimethoxysilyl)phenyl)methylsilane, tris(4-(trimethoxysilyl)phenyl)methylsilane, tris(4-(dimethoxymethylsilyl)phenyl)methylsilane, tris(4-(dimethoxyphenylsilyl)phenyl)methylsilane, tetrakis(dimethoxysilylmethyl)silane, tetrakis(trimethoxysilylmethyl)silane, tetrakis(dimethoxymethylsilylmethyl)silane, tetrakis(dimethoxyphenylsilylmethyl)silane, tetrakis(1-(dimethoxysilyl)ethyl)silane, tetrakis(1-(trimethoxysilyl)ethyl)silane, tetrakis(1-(dimethoxymethylsilyl)ethyl)silane, tetrakis(1-(dimethoxyphenylsilyl)ethyl)silane, tetrakis(2-(dimethoxysilyl)ethyl)silane, tetrakis(2-(trimethoxysilyl)ethyl)silane, tetrakis(2-(dimethoxymethylsilyl)ethyl)silane, tetrakis(2-(dimethoxyphenylsilyl)ethyl)silane, tetrakis(2-(dimethoxysilyl)propyl)silane, tetrakis(2-(trimethoxysilyl)propyl)silane, tetrakis(2-(dimethoxymethylsilyl)propyl)silane, tetrakis(2-(dimethoxyphenylsilyl)propyl)silane, tetrakis(3-(dimethoxysilyl)propyl)silane, tetrakis(3-(trimethoxysilyl)propyl)silane, tetrakis(3-(dimethoxymethylsilyl)propyl)silane, tetrakis(3-(dimethoxyphenylsilyl)propyl)silane, tetrakis(4-(dimethoxysilyl)butyl)silane, tetrakis(4-(trimethoxysilyl)butyl)silane, tetrakis(4-(dimethoxymethylsilyl)butyl)silane, tetrakis(4-(dimethoxyphenylsilyl)butyl)silane, tetrakis(5-(dimethoxysilyl)pentyl)silane, tetrakis(5-(trimethoxysilyl)pentyl)silane, tetrakis(5-(dimethoxymethylsilyl)pentyl)silane, tetrakis(5-(dimethoxyphenylsilyl)pentyl)silane, tetrakis(6-(dimethoxysilyl)hexyl)silane, tetrakis(6-(trimethoxysilyl)hexyl)silane, tetrakis(6-(dimethoxymethylsilyl)hexyl)silane, tetrakis(6-(dimethoxyphenylsilyl)hexyl)silane, tetrakis(2-(dimethoxysilyl)ethynyl)silane, tetrakis(2-(trimethoxysilyl)ethynyl)silane, tetrakis(2-(dimethoxymethylsilyl)ethynyl)silane, tetrakis(2-(dimethoxyphenylsilyl)ethynyl)silane, tetrakis(4-(dimethoxysilyl)phenyl)silane, tetrakis(4-(trimethoxysilyl)phenyl)silane, tetrakis(4-(dimethoxymethylsilyl)phenyl)silane and tetrakis(4-(dimethoxyphenylsilyl)phenyl)silane. These compounds are used singly, as a mixture of two or more compounds.

Preferable examples of the crosslinking agent represented by formula (2) used in this invention can include tris(1-(trimethoxysilyl)ethyl)methane, tris(1-(dimethoxymethylsilyl)ethyl)methane, tris(2-(trimethoxysilyl)ethyl)methane, tris(2-(dimethoxymethylsilyl)ethyl)methane, tris(3-(trimethoxysilyl)propyl)methane, tris(3-(dimethoxymethylsilyl)propyl)methane, tris(4-(trimethoxysilyl)butyl)methane, tris(4-(dimethoxymethylsilyl)butyl)methane, 1,1,1-tris(trimethoxysilyl)ethane, 1,1,1-tris(dimethoxymethylsilyl)ethane, tetrakis(trimethoxysilyl)methane, tetrakis(dimethoxymethylsilyl)methane, tetrakis(trimethoxysilylmethyl)methane, tetrakis(dimethoxymethylsilylmethyl)methane, tetrakis(2-(trimethoxysilyl)ethyl)methane, tetrakis(2-(dimethoxymethylsilyl)ethyl)methane, tris(trimethoxysilylmethyl)silane, tris(dimethoxymethylsilylmethyl) silane, tris(1-(dimethoxysilyl)ethyl)silane, tris(1-(trimethoxysilyl)ethyl)silane, tris(1-(dimethoxymethylsilyl)ethyl)silane, tris(2-(dimethoxysilyl)ethyl)silane, tris(2-(trimethoxysilyl)ethyl)silane, tris(2-(dimethoxymethylsilyl)ethyl) silane, tris(2-(dimethoxysilyl)propyl)silane, tris(2-(trimethoxysilyl)propyl)silane, tris(2-(dimethoxymethylsilyl)propyl)silane, tris(3-(dimethoxysilyl)propyl)silane, tris(3-(trimethoxysilyl)propyl)silane, tris(3-(dimethoxymethylsilyl)propyl)silane, tris(trimethoxysilylmethyl)methoxysilane, tris(dimethoxymethylsilylmethyl)methoxysilane, tris(1-(dimethoxysilyl)ethyl)methoxysilane, tris(1-(trimethoxysilyl)ethyl)methoxysilane, tris(1-(dimethoxymethylsilyl)ethyl)methoxysilane, tris(2-(dimethoxysilyl)ethyl)methoxysilane, tris(2-(trimethoxysilyl)ethyl)methoxysilane, tris(2-(dimethoxymethylsilyl)ethyl)methoxysilane, tris(2-(dimethoxysilyl)propyl)methoxysilane, tris(2-(trimethoxysilyl)propyl)methoxysilane, tris(2-(dimethoxymethylsilyl)propyl)methoxysilane, tris(3-(dimethoxysilyl)propyl)methoxysilane, tris(3-(trimethoxysilyl)propyl)methoxysilane, tris(3-(dimethoxymethylsilyl)propyl)methoxysilane, tris(dimethoxysilylmethyl)methylsilane, tris(trimethoxysilylmethyl)methylsilane, tris(dimethoxymethylsilylmethyl)methylsilane, tris(1-(dimethoxysilyl)ethyl)methylsilane, tris(1-(trimethoxysilyl)ethyl)methylsilane, tris(1-(dimethoxymethylsilyl)ethyl)methylsilane, tris(2-(dimethoxysilyl)ethyl)methylsilane, tris(2-(trimethoxysilyl)ethyl)methylsilane, tris(2-(dimethoxymethylsilyl)ethyl)methylsilane, tris(2-(dimethoxysilyl)propyl)methylsilane, tris(2-(trimethoxysilyl)propyl)methylsilane, tris(2-(dimethoxymethylsilyl)propyl)methylsilane, tris(3-(dimethoxysilyl)propyl)methylsilane, tris(3-(trimethoxysilyl)propyl)methylsilane, tris(3-(dimethoxymethylsilyl)propyl)methylsilane, tetrakis(dimethoxysilylmethyl)silane, tetrakis(trimethoxysilylmethyl)silane, tetrakis(dimethoxymethylsilylmethyl)silane, tetrakis(1-(dimethoxysilyl)ethyl)silane, tetrakis(1-(trimethoxysilyl)ethyl)silane, tetrakis(1-(dimethoxymethylsilyl)ethyl)silane, tetrakis(2-(dimethoxysilyl)ethyl)silane, tetrakis(2-(trimethoxysilyl)ethyl)silane, tetrakis(2-(dimethoxymethylsilyl)ethyl)silane, tetrakis(2-(dimethoxysilyl)propyl)silane, tetrakis(2-(trimethoxysilyl)propyl)silane, tetrakis(2-(dimethoxymethylsilyl)propyl)silane, tetrakis(3-(dimethoxysilyl)propyl)silane, tetrakis(3-(trimethoxysilyl)propyl)silane, tetrakis(3-(dimethoxymethylsilyl)propyl)silane.

Particularly preferable examples of the crosslinking agent represented by formula (2) used in this invention can include tris(1-(trimethoxysilyl)ethyl)methane, tris(1-(dimethoxymethylsilyl)ethyl)methane, tris(2-(trimethoxysilyl)ethyl)methane, tris(2-(dimethoxymethylsilyl)ethyl)methane, tris(3-(trimethoxysilyl)propyl)methane, tris(3-(dimethoxymethylsilyl)propyl)methane, tris(1-(dimethoxysilyl)ethyl)silane, tris(1-(trimethoxysilyl)ethyl)silane, tris(1-(dimethoxymethylsilyl)ethyl)silane, tris(2-(dimethoxysilyl)ethyl)silane, tris(2-(trimethoxysilyl)ethyl)silane, tris(2-(dimethoxymethylsilyl)ethyl)silane, tris(2-(dimethoxysilyl)propyl)silane, tris(2-(trimethoxysilyl)propyl)silane, tris(2-(dimethoxymethylsilyl)propyl)silane, tris(3-(dimethoxysilyl)propyl)silane, tris(3-(trimethoxysilyl)propyl)silane, tris(3-(dimethoxymethylsilyl)propyl)silane, tris(1-(dimethoxysilyl)ethyl)methylsilane, tris(1-(trimethoxysilyl)ethyl)methylsilane, tris(1-(dimethoxymethylsilyl)ethyl)methylsilane, tris(2-(dimethoxysilyl)ethyl)methylsilane, tris(2-(trimethoxysilyl)ethyl)methylsilane, tris(2-(dimethoxymethylsilyl)ethyl)methylsilane, tris(2-(dimethoxysilyl)propyl)methylsilane, tris(2-(trimethoxysilyl)propyl)methylsilane, tris(2-(dimethoxymethylsilyl)propyl)methylsilane, tris(3-(dimethoxysilyl)propyl)methylsilane, tris(3-(trimethoxysilyl)propyl)methylsilane, tris(3-(dimethoxymethylsilyl)propyl)methylsilane.

The crosslinking agent may be added in a amount (mole) of preferably 0.0001 to 1.0 times, more preferably 0.001 to 0.5 times as much as the total amount (mole) of silane compound or compounds.

The basic catalyst used in the invention can include, but are not limited to, amines such as ammonia, ethylamine, propylamine, diisopropylamine, triethylamine and triethanolamine; quaternary ammonium hydroxides such as tetramethylammonium hydroxide, tetraethylammonium hydroxide, tetrapropylammonium hydroxide, tetrabutylammonium hydroxide, and choline. The basic catalyst may be preferably quaternary ammonium hydroxide. The basic catalyst may be more preferably selected from the group consisting of tetramethylammonium hydroxide, choline and tetrapropylammonium hydroxide.

The basic catalyst may be added in an amount (mole) of preferably 0.001 to 100 times, more preferably 0.01 to 10 times as much as the amount (mole) of the raw material of silane compound or compounds.

The organic solvent used in this reaction may be a solvent such as alcohol which corresponds to the alkoxy group of the silane compound. The solvent may includes, but is not limited to, methanol, ethanol, isopropyl alcohol, butanol, propylene glycol monomethyl ether, propylene glycol monopropyl ether, propylene glycol monopropyl ether acetate, ethyl lactate and cyclohexanone. The solvent may be in an amount (weight) of preferably 0.1 to 500 times, more preferably 1 to 100 times as much as the total amount (weight) of the silane compound.

The water used for the hydrolysis and condensation may be in an amount (mole) of preferably 0.5 to 1000, more preferably 1 to 100 times as much as the amount (mole) of silane compound or compounds.

The preferable reaction temperature for this reaction may be generally 0° C. to the boiling point of the alcohol produced by the hydrolysis and condensation, preferably from temperature to 100° C. Although the reaction time may not be particularly limited, it may be generally 10 minutes to 30 hours, more preferably 30 minutes to 10 hours.

The condensation product may have preferably weight-average molecular weight of 10,000 to 1,000,000, with Gel Permeation Chromatography (GPC) based on polyethylene.

The solvent by which the solvent of the condensation product solution is replaced so as to prepare a coating liquid may include aliphatic hydrocarbon solvent such as n-pentane, isopentane, n-hexane, isohexane, n-heptane, 2,2,4-trimethylpentane, n-octane, isooctane, cyclohexane and methylcyclohexane; aromatic hydrocarbon solvent such as benzene, toluene, xylene, ethylbenzene, trimethylbenzene, methylethylbenzene, n-propylbenzene, isopropylbenzene, diethylbenzene, isobutylbenzene, triethylbenzene, diisopropyl benzene and n-amylnaphthalene; ketone solvent such as acetone, methyl ethyl ketone, methyl n-propyl ketone, methyl-n-butyl ketone, methyl isobutyl ketone, cyclohexanone, 2-hexanone, methylcyclohexanone, 2,4-pentanedione, acetonylacetone, diacetone alcohol, acetophenone and fenthion; ether solvent such as ethyl ether, isopropyl ether, n-butyl ether, n-hexyl ether, 2-ethylhexyl ether, dioxolane, 4-methyldioxolane, dioxane, dimethyldioxane, ethylene glycol mono-n-butyl ether, ethylene glycol mono-n-hexyl ether, ethylene glycol monophenyl ether, ethylene glycol mono-2-ethylbutyl ether, ethylene glycol dibutyl ether, diethylene glycol monomethyl ether, diethylene glycol dimethyl ether, diethylene glycol monoethyl ether, diethylene glycol diethyl ether, diethylene glycol monopropyl ether, diethylene glycol dipropyl ether, diethylene glycol monobutyl ether, diethylene glycol dibutyl ether, tetrahydrofuran, 2-methyltetrahydrofuran, propylene glycol monomethyl ether, propylene glycol dimethyl ether, propylene glycol monoethyl ether, propylene glycol diethyl ether, propylene glycol monopropyl ether, propylene glycol dipropyl ether, propylene glycol monobutyl ether, dipropylene glycol dimethyl ether, dipropylene glycol diethyl ether, dipropylene glycol dipropyl ether and dipropylene glycol dibutyl ether; ester solvent such as diethylcarbonate, ethyl acetate, γ-butyrolactone, γ-valerolactone, n-propyl acetate, isopropyl acetate, n-butyl acetate, isobutyl acetate, sec-butyl acetate, n-pentyl acetate, 3-methoxybutyl acetate, methylpentyl acetate, 2-ethylbutyl acetate, 2-ethhylhexyl acetate, benzyl acetate, cyclohexyl acetate, methylcyclohexyl acetate, n-nonyl acetate, methyl acetoacetata, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, dipropylene glycol monomethyl ether acetate, dipropylene glycol monoethyl ether acetate, dipropylene glycol mono-n-butyl ether acetate, glycol diacetate, methoxytriglycol acetate, ethyl propionate, n-butyl propionate, isoamyl propionate, diethyl oxalate, di-n-butyl oxalate, methyl lactate, ethyl lactate, n-butyl lactate, n-amyl lactate, diethyl malonate, dimethyl phthalate and diethyl phthalate; nitrogen-containing solvent such as N-methylformamide, N,N-dimethylformamide, acetamide, N-methylacetamide, N,N-dimethylacetamide, N-methylpropionamide and N-methylpyrrolidone; sulfur-containing solvent such as dimethyl sulfide, diethyl sulfide, thiophene, tetrahydrothiophene, dimethylsulfoxide, sulfolane and 1,3-propanesultone. These solvents may be used sigly or as a mixture of two or more solvents.

The exchange of the solvents may be done in a method wherein the solvent of the condensation product solution is evaporated with a rotary evaporatoer or an evaporation vessel under a pressure lower than the atmospheric pressure and a new solvent is added thereto. However, the exchange of the solvent can be done in the other metods.

A film having a desirable thickness can be formed by spin-coating an appropriately controlled concentration of the coating liquid with an appropriate number of spin rotations.

For example, the actual film thickness of the thin film may be about 0.2 to 1 μm, but not limited to this range. For example, by applying the coating solution several times, the thickness of the film can be increased. The solvent used for dilution may include the same solvents as said solvent used for the replacement so as to prepare a coating liquid. The solvent may be used singly or as a mixture of two or more solvents.

Although the degree of dilution may depend on the viscosity and intended film thickness, generally 50 to 99 wt %, preferably 75 to 95 wt % solvent may be contained in the diluted solution.

The film thus prepared may be heated preferably for several minutes at 50° C. to 150° C. in a drying step (generally called a pre-bake in the semiconductor process) so as to remove the solvent. The heating step for hardening the coating film follows the dring step. In the heating step, the coated film may be heated to preferably 150 to 500° C., more preferably 200 to 400° C. The heatig time may be preferably 1 to 300 minutes, more preferably 1 to 100 minutes.

The obtained film has high mechanical strength in the entire film. Measured with nanoindentation, hardness is commonly 1 to 10 GPa and modulus of elasticity is commonly 5 to 50 GPa. This indicates that the obtained film has much higher mechanical strength than the porous material produced by adding a thermally decomposed polymer to silicone resin and thermally removing the polymer so as to form pores. It is because the material has hardness of 0.05 to 2 GPa and modulus of elasticity of 1.0 to 4.0 GPa.

The porous film of the present invention may be particularly preferable as the interlevel insulator film of the interconnections in a semiconductor integrated circuit. The semiconductor device is required to reduce interconnection capacitance in order to prevent interconnection delay when highly integrated. Various means have been developed to achieve this, and one of them is to reduce the relative permittivity of the interlevel insulator film disposed between metal interconnections. When an interlevel insulator film is prepared by using the composition for forming a porous film of the present invention, the semiconductor device can be downsized and faster and consume less power.

There is a conventional problem that when a porous film is prepared by introducing pores in the film so as to lower the dielectric constant, the mechanical strength of the film decreases as the density of the material composing the film decreases. The decrease in mechanical strength not only affects the strength of the semiconductor device itself but also causes exfoliation due to insufficient strength in a chemical mechanical polishing process which is generally used in the fabrication process. Particularly, when used as the interlevel insulator film of a semiconductor, the porous film of the present invention with high mechanical strength and low relative permittivity prevents such exfoliation, thereby making it possible to fabricate a high-speed, highly reliable and downsized semiconductor device.

The embodiments of the semiconductor device of the present invention will be described below. FIG. 1 indicates an schematic cross-sectional view of an example of the semiconductor device of the present invention.

In FIG. 1, the substrate 1 is an Si semiconductor substrate such as an Si substrate or an SOI (Si-on-insulator) substrate; however, it can be a compound semiconductor substrate such as SiGe or GaAs. The interlevel insulator films include the interlevel insulator film 2 of the contact layer; the interlevel insulator films 3, 5, 7, 9, 11, 13, 15, and 17 of the interconnection layers; and the interlevel insulator films 4, 6, 8, 10, 12, 14, and 16 of the via layers. The interconnection layers corresponding to the lowermost interlevel insulator film 3 through the uppermost insulator film 17 are abbreviated as M1, M2, M3, M4, M5, M6, M7, and M8, respectively. The via layers corresponding to the lowermost interlevel insulator film 4 through the uppermost insulator film 16 are abbreviated as V1, V2, V3, V4, V5, V6, and V7, respectively. Although some of the metal interconnections are referred to with the numbers 18 and 21 to 24, the other regions with the same pattern not labeled with numbers indicate metal interconnections. The via plug 19 is made from a metal. In the case of copper interconnection, copper is generally used. The regions having the same pattern as the via plug 19 represent via plugs although they are not labeled with numbers in the drawing. The contact plug 20 is connected to the gate of the transistor (not illustrated) formed on the top surface of the substrate 1 or to the substrate. Thus, the interconnection layers and the via layers are alternately stacked, and multilayer interconnections generally indicate M1 and regions higher than M1. In general, M1 to M3 are called local interconnections, M4 and M5 are called intermediate interconnections or semi-global interconnections, and M6 to M8 are called global interconnections.

In the semiconductor device of the present invention, the porous film of the present invention is used as one or more of the interlevel insulator films 3, 5, 7, 9, 11, 13, 15, and 17 of the interconnection layers or the insulator films 4, 6, 8, 10, 12, 14, and 16 of the via layers.

For example, when the porous film of the present invention is used for the interlevel insulator film 3 of the interconnection layer (M1), the interconnection capacitance between the metal interconnection 21 and the metal interconnection 22 can be greatly reduced. When the porous film of the present invention is used for the interlevel insulator film 4 of the via layer (V1), the interconnection capacitance between the metal interconnection 23 and the metal interconnection 24 can be greatly reduced. Using the porous film with a low relative permittivity of the present invention as an interconnection layer can greatly reduce the metal interconnection capacitance in the same layer. On the other hand, using the porous film with a low relative permittivity of the present invention as a via layer can greatly reduce the interlevel capacitance between the vertical metal interconnections.

Therefore, using the porous film of the present invention for all of the interconnection layers and the via layers can greatly reduce the parasitic capacitance of the interconnections. Hence, the use of the porous film of the present invention as insulator films of the interconnections prevents a conventional problem, that is, an increase in the dielectric constant resulting from the porous film absorbing humidity while multilayered interconnections are formed by stacking porous films. As a result, the semiconductor device can perform high-speed and low-power operations.

The porous film of the present invention enables a semiconductor device to have higher mechanical strength by its high mechanical strength, thereby greatly improving the yield of the fabrication and the reliability of the semiconductor device.

The present invention will be described specifically through the following examples, but is not limited to them.

EXAMPLE 1

The 178 g of ethanol and 95 g of an 1.68 wt % solution of tetramethylammonium hydroxide (made by Tama Chemicals Company) were uniformly mixed. After this solution was raised to 60° C., a mixture of 19.3 g methyltrimethoxysilane, 26.9 g tetraethoxysilane and 5 g tris(2-(trimethoxysilyl)ethyl)methylsilane was added dropwise thereto over two hours at this temperature. Then, the solution was stirred for two hours at 60° C., and 10.5 g of 20 wt % maleic acid and 165 g propylene glycol monopropyl ether were added thereto. The resulting solution was concentrated with a rotary evaporator until the solution became 160 g. The 150 g ethyl acetate and 150 g ultrapure water were added thereto, stirred, left to stand still, and separated to obtain an organic phase. The organic phase was concentrated again until the weight of the solution reached 150 g so as to yield a desired coating liquid. The coating liquid was applied on an 8-inch wafer with a spin coater at 1500 rpm for one minute. The coated film was heated for two minutes at 120° C. on a hot plate to yield the film having the thickness of 5,600 A. The film was heated for a further three minutes at 250° C., and then heated for one hour at 450° C. under a nitrogen atmosphere in a clean oven. The obtained film had other

COMPARISON EXAMPLE 1

The coating liquid was obtained in the same manner as in Example except that tris(2-(trimethoxysilyl)ethyl)methylsilane of Example 1 was not added. The coated film was obtained in the same manner as Example 1. The film had the thickness of 4,900 A, dielectric constant of 2.2 and modulus of elasticity of 4.5 GPa.

COMPARISON EXAMPLE 2

The coating liquid was obtained in the same manner as in Example except that 5 g of 1,2-bis(trimethoxysilyl)ethane was added in the place of tris(2-(trimethoxysilyl)ethyl) methylsilane. The coated film was obtained in the same manner as Example 1. The film had the thickness of 5,200 A, dielectric constant of 2.3 and modulus of elasticity of 4.8 GPa.

The result is as shown in Table 1.

TABLE 1

| | silane comound | silicon-containing crosslinking agent | basic catalyst | dielectric constant | modulus (GPa) |
|---|---|---|---|---|---|
| Ex. 1 | methyltrimethoxysilane tetraethoxysilane | tris(2-(trimethoxysilyl) ethyl)methylsilane | tetramethylammonium hydroxide | 2.3 | 8.1 |
| Ex. 2 | methyltrimethoxysilane tetraethoxysilane | tris(2-(trimethoxysilyl) ethyl)methylsilane | choline | 2.3 | 7.9 |
| Ex. 3 | methyltrimethoxysilane tetraethoxysilane | tris(2-(trimethoxysilyl) ethyl)methylsilane | tetrapropylammonium hydroxide | 2.2 | 5.9 |
| Comp. Ex. 1 | methyltrimethoxysilane tetraethoxysilane | none | tetramethylammonium hydroxide | 2.2 | 4.5 |
| Comp. Ex. 2 | methyltrimethoxysilane tetraethoxysilane | 2-bis(trimethoxysilyl)ethane | tetramethylammonium hydroxide | 2.3 | 4.8 | thickness of 7,200 A. The film had dielectric constant of 2.3 and modulus of elasticity of 8.1 GPa.

The dielectric constant was measured with the automatic mercury CV measurement device 495-CV system (made by Japan SSM Company) using the CV method with an automatic mercury probe. The modulus of elasticity was measured with the Nano Indenter (made by the Nano Instruments Company).

EXAMPLE 2

The coating liquid was obtained in the same manner as in Example except that 95.8 g of an aqueous 2.23 wt % solution of choline (made by Tama Chemicals Company) was added in the place of the 1.68 wt % solution of tetramethylammonium hydroxide. The coated film was otained in the same manner as Example 1. The film had thickness of 5,800 A, dielectric constant of 2.3 and modulus of elasticity of 7.9 GPa.

EXAMPLE 3

The coating liquid was obtained in the same manner as in Example except that 97.5 g of an aqueous 3.78 wt % solution of tetrapropylammonium hydroxide (made by Tama Chemicals Company) was added in the palce of the 1.68 wt % solution of tetramethylammonium hydroxide. The coated film was obtained in the same manner as Example 1. The film had the thickness of 4,800 A, dielectric constant of 2.2 and modulus of elasticity of 5.9 GPa.

The invention claimed is:

1. A composition for forming a porous film comprising a condensation product and an organic solvent wherein the condensation product is obtained by hydrolysis and condensation, in the presence of a basic catalyst, of one or more silane compounds represented by formula (1): $R^1_k Si (OR^2)_{4-k}$ wherein $R^1$ represents an organic group having 1 to 8 carbons, and when there are two or more $R^1$s, the $R^1$s may be independently the same or different; $R^2$ represents an alkyl group having 1 to 4 carbons, and when there are two or more $R^2$s, the $R^2$s may be independently the same or different; and k is an integer from 0 to 3;

and one or more crosslinking agents represented by formula (2):

$\{X_j(Y)_{3-j}Si\text{-}(L)_m\text{-}\}_n MZ_{4-n}$, wherein X represents a hydrogen atom, a halogen atom or an alkoxy group having 1 to 4 carbons; Y represents a hydrogen atom, an alkyl group having 1 to 4 carbons or a phenyl; Z represents a hydrogen atom, a halogen atom, an alkyl group having 1 to 4 carbons, an alkoxy group having 1 to 4 carbons or a phenyl; L represents a linear or branched alkylene group having 1 to 6 carbons, an alkenylene having 1 to 6 carbons, an alkynylene having 1 to 6 carbons or a phenylene group; M represents a carbon atom or a silicon atom; j is an integer from 1 to 3; m is 0 or 1; and n is 3 or 4.

2. The composition for forming a porous film according to claim 1 wherein said basic catalyst comprises a quaternary ammonium hydroxide.

3. The composition for forming a porous film according to claim 2 wherein said quaternary ammonium hydroxide is selected from the group consisting of tetramethylammonium hydroxide, choline and tetrapropylammonium hydroxide.

4. A method for manufacturing a porous film comprising applying a composition according to claims 1 on a substrate to form a film thereon, drying the film and heating the dried film to cure the film.

5. A porous film comprising a composition according to claim 1.

6. An interlevel insulating film comprising a composition according to claim 1.

7. A semiconductor device comprising a porous film therein, the porous film comprising a composition comprising a condensation product and an organic solvent wherein the condensation product is obtained by hydrolysis and condensation, in the presence of a basic catalyst, of one or more silane compounds represented by formula (1): $R^1_k Si(OR^2)_{4-k}$ wherein $R^1$ represents an organic group having 1 to 8 carbons, and when there are two or more $R^1$s, the $R^1$s may be independently the same or different; $R^2$ represents an alkyl group having 1 to 4 carbons, and when there are two or more $R^2$s, the $R^2$s may be independently the same or different; and k is an integer from 0 to 3;

and one or more crosslinking agents represented by formula (2): $\{X_j(Y)_{3-j}Si\text{-}(L)_m\text{-}\}_n MZ_{4-n}$ wherein X represents a hydrogen atom, a halogen atom or an alkoxy group having 1 to 4 carbons; Y represents a hydrogen atom, an alkyl group having 1 to 4 carbons or a phenyl; Z represents a hydrogen atom, a halogen atom, an alkyl group having 1 to 4 carbons, an alkoxy group having 1 to 4 carbons or a phenyl; L represents a linear or branched alkylene group having 1 to 6 carbons, an alkenylene having 1 to 6 carbons, an alkynylene having 1 to 6 carbons or a phenylene group; M represents a carbon atom or a silicon atom; j is an integer from 1 to 3; m is 0 or 1; and n is 3 or 4.

8. The semiconductor device according to claim 7 wherein said basic catalyst comprises a quaternary ammonium hydroxide.

9. The semiconductor device according to claim 8 wherein said quaternary ammonium hydroxide is selected from the group consisting of tetramethylammonium hydroxide, choline and tetrapropylammonium hydroxide.

10. The semiconductor device according to claims 7 wherein said porous film is between metal interconnections in a same layer of multi-level interconnects, or is between upper and lower metal interconnection layers.

* * * * *